(12) United States Patent
Lackey

(10) Patent No.: US 12,608,702 B2
(45) Date of Patent: *Apr. 21, 2026

(54) DIGITAL ASSET MANAGEMENT

(71) Applicant: Method90 LLC, Charlotte, NC (US)

(72) Inventor: Mac Lackey, Charlotte, NC (US)

(73) Assignee: Method90 LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,236

(22) Filed: May 16, 2024

(65) Prior Publication Data

US 2024/0303641 A1 Sep. 12, 2024

Related U.S. Application Data

(63) Continuation of application No. 17/325,119, filed on May 19, 2021, now Pat. No. 12,169,829.

(51) Int. Cl.
*G06Q 20/38* (2012.01)
*G06Q 10/02* (2012.01)
(Continued)

(52) U.S. Cl.
CPC ....... *G06Q 20/38215* (2013.01); *G06Q 10/02* (2013.01); *G06Q 20/3226* (2013.01);
(Continued)

(58) Field of Classification Search
CPC ......... G06Q 20/38215; G06Q 20/3226; G06Q 20/02; G06Q 20/223; G06Q 20/3827;
(Continued)

(56) References Cited

U.S. PATENT DOCUMENTS 11,295,244 B2 4/2022 Thomas et al.
2012/0324542 A1* 12/2012 McLaughlin .......... G06Q 10/02
726/4
(Continued)

FOREIGN PATENT DOCUMENTS

WO WO2018039374 A1 3/2018
WO WO2021054989 A1 3/2021

OTHER PUBLICATIONS

Office Action for U.S. Appl. No. 17/325,119, mailed on Oct. 30, 2023, Lackey, "Digital Asset Management", 11 pgs.
(Continued)

*Primary Examiner* — Vu V Tran
(74) *Attorney, Agent, or Firm* — Lee & Hayes, P.C.

(57) ABSTRACT

Methods and systems for digital asset management are discussed herein. Physical assets, such as a seat or group of seats in a venue (e.g., sports stadium, concert hall, movie theater, etc.) or a housing unit or group of housing units (e.g., apartment, condominium, hotel room, etc.) may be tokenized and associated with a minted non-fungible token (NFT). The NFT may be entered into a distributed ledger such that, when the asset is involved in a transaction (e.g., rented, purchased, etc.), a record of the transaction is securely and permanently entered into the distributed ledger. By utilizing the NFT and the distributed ledger during the transaction of the asset, all participants involved can be assured that proper and secure compensation is being provided for use of the asset.

18 Claims, 9 Drawing Sheets

(51) Int. Cl.
*G06Q 20/32* (2012.01)
*H04L 9/00* (2022.01)
*H04L 9/32* (2006.01)

(52) U.S. Cl.
CPC ....... *H04L 9/3213* (2013.01); *G06Q 2220/00* (2013.01); *H04L 2209/603* (2013.01)

(58) Field of Classification Search
CPC .. G06Q 10/02; G06Q 2220/00; H04L 9/3213; H04L 9/50; H04L 2209/603
See application file for complete search history.

(56) References Cited

U.S. PATENT DOCUMENTS

| | | | |
|---|---|---|---|
| 2014/0278592 A1 | 9/2014 | Giampapa | |
| 2016/0300162 A1 | 10/2016 | Mcmanus | |
| 2019/0205894 A1* | 7/2019 | Gonzales, Jr. ........ | H04L 9/0643 |
| 2020/0065899 A1* | 2/2020 | Fritsch .............. | G06Q 30/0619 |
| 2021/0119807 A1* | 4/2021 | Chen .................... | H04L 9/3242 |
| 2021/0342836 A1 | 11/2021 | Cella et al. | |
| 2021/0357893 A1* | 11/2021 | Kang ................ | G06Q 20/1235 |
| 2022/0374888 A1 | 11/2022 | Lackey | |

OTHER PUBLICATIONS

Office Action for U.S. Appl. No. 17/325,119, mailed on Apr. 18, 2024, Lackey, "Digital Asset Management", 13 Pages.
The PCT Search Report and Written Opinion mailed Sep. 12, 2022 for PCT application No. PCT/US2022/029925, 8 pages.

\* cited by examiner

Processor(s) 602

Network Interface 606

Use Interface 608

Hardware
Components 610

Computer Readable Media 604

NFT Transaction
Component 612

Asset Transaction
Component 614

Configuration
Information 616

600

User
Device

700

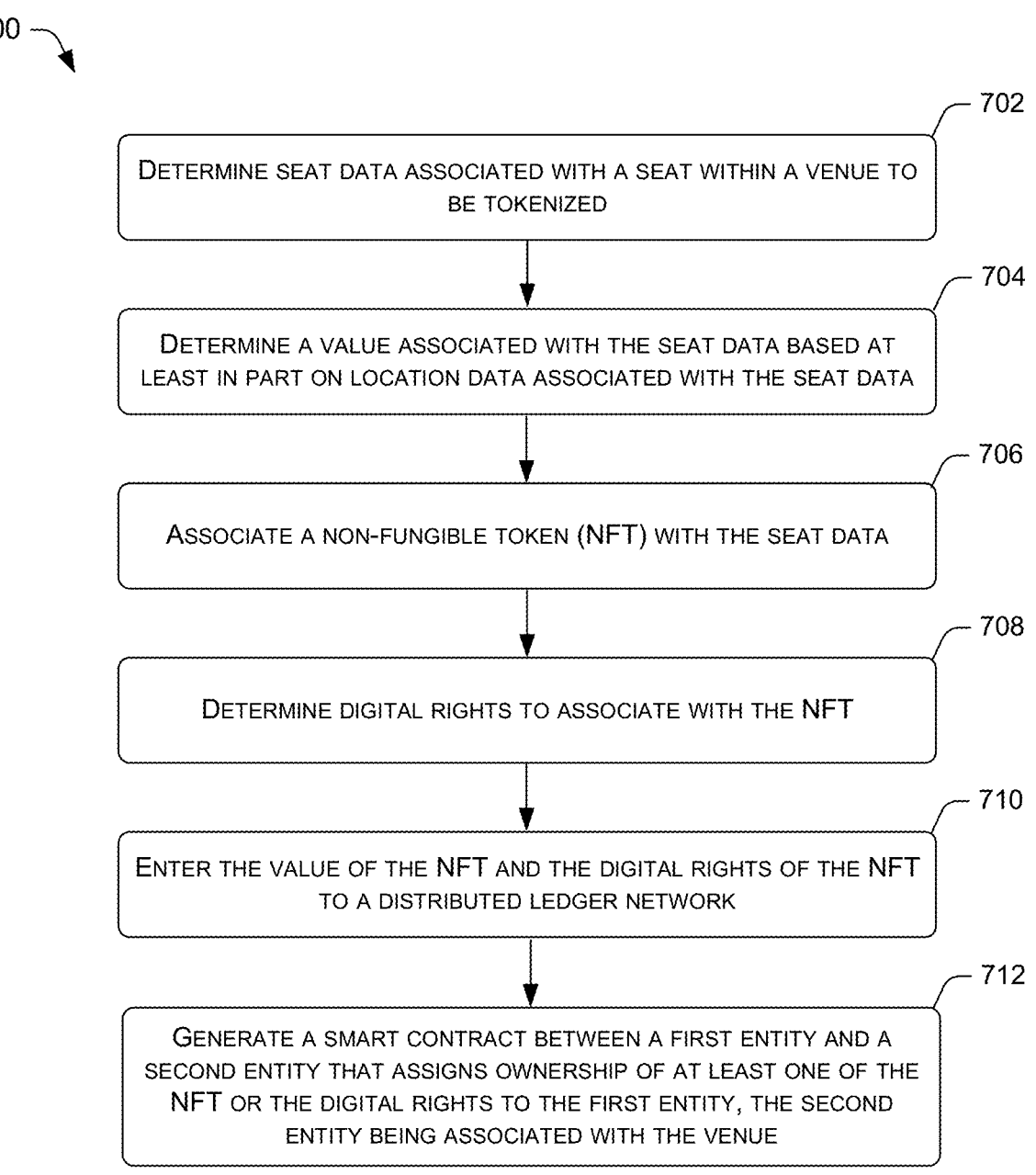

702

DETERMINE SEAT DATA ASSOCIATED WITH A SEAT WITHIN A VENUE TO BE TOKENIZED

704

DETERMINE A VALUE ASSOCIATED WITH THE SEAT DATA BASED AT LEAST IN PART ON LOCATION DATA ASSOCIATED WITH THE SEAT DATA

706

ASSOCIATE A NON-FUNGIBLE TOKEN (NFT) WITH THE SEAT DATA

708

DETERMINE DIGITAL RIGHTS TO ASSOCIATE WITH THE NFT

710

ENTER THE VALUE OF THE NFT AND THE DIGITAL RIGHTS OF THE NFT TO A DISTRIBUTED LEDGER NETWORK

712

GENERATE A SMART CONTRACT BETWEEN A FIRST ENTITY AND A SECOND ENTITY THAT ASSIGNS OWNERSHIP OF AT LEAST ONE OF THE NFT OR THE DIGITAL RIGHTS TO THE FIRST ENTITY, THE SECOND ENTITY BEING ASSOCIATED WITH THE VENUE

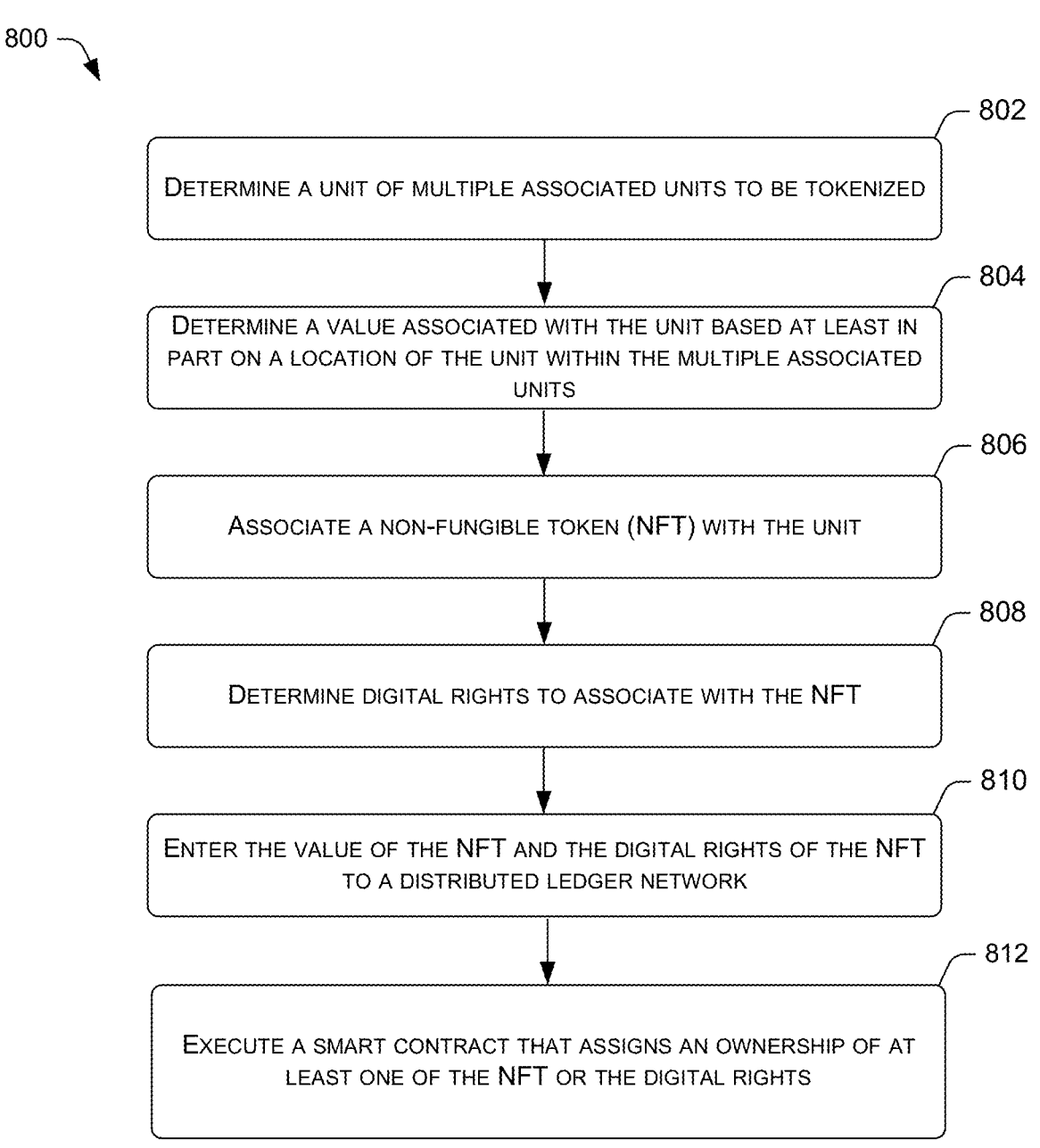

802

DETERMINE A UNIT OF MULTIPLE ASSOCIATED UNITS TO BE TOKENIZED

804

DETERMINE A VALUE ASSOCIATED WITH THE UNIT BASED AT LEAST IN PART ON A LOCATION OF THE UNIT WITHIN THE MULTIPLE ASSOCIATED UNITS

806

ASSOCIATE A NON-FUNGIBLE TOKEN (NFT) WITH THE UNIT

808

DETERMINE DIGITAL RIGHTS TO ASSOCIATE WITH THE NFT

810

ENTER THE VALUE OF THE NFT AND THE DIGITAL RIGHTS OF THE NFT TO A DISTRIBUTED LEDGER NETWORK

812

EXECUTE A SMART CONTRACT THAT ASSIGNS AN OWNERSHIP OF AT LEAST ONE OF THE NFT OR THE DIGITAL RIGHTS

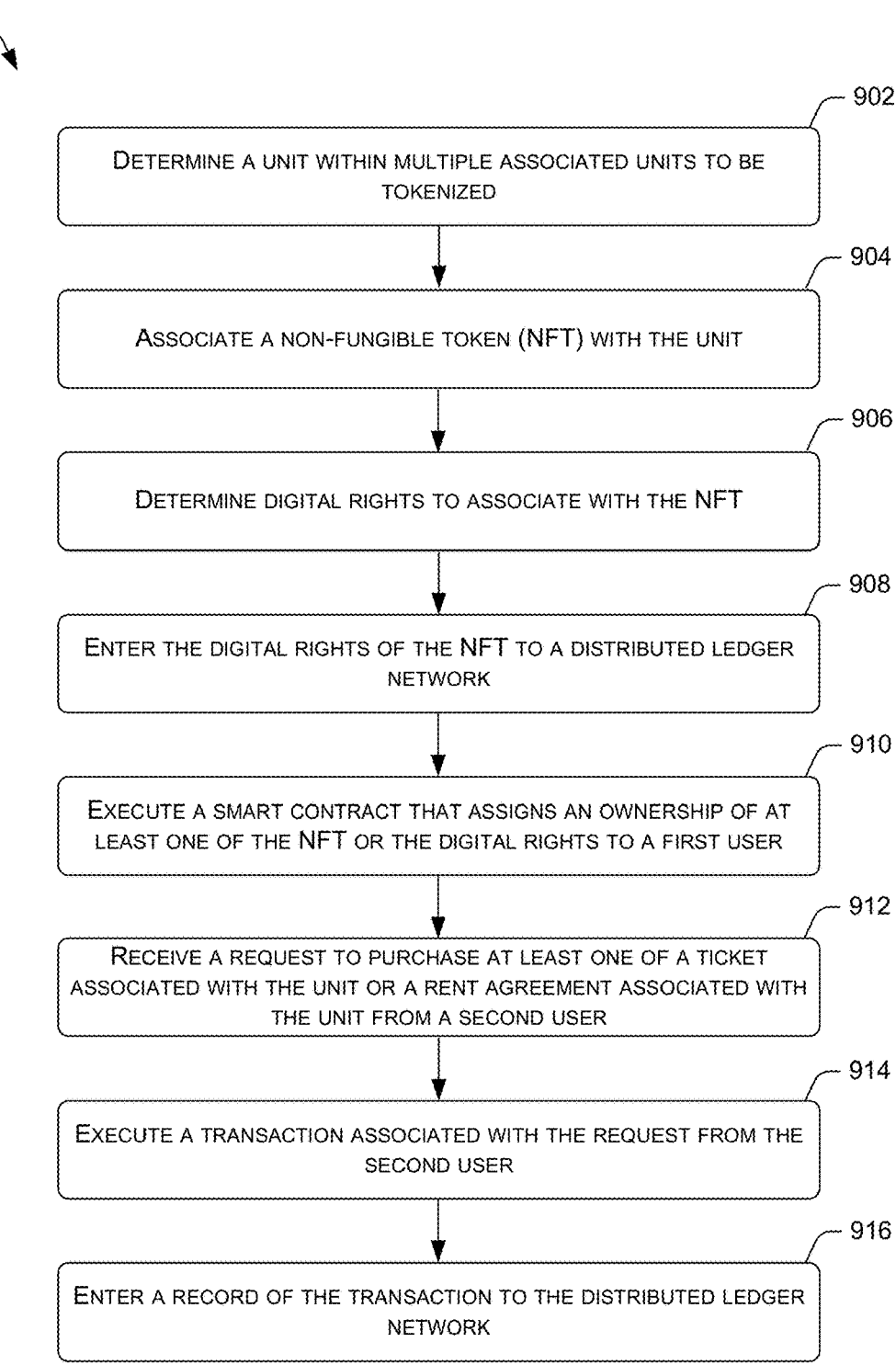

902

DETERMINE A UNIT WITHIN MULTIPLE ASSOCIATED UNITS TO BE TOKENIZED

904

ASSOCIATE A NON-FUNGIBLE TOKEN (NFT) WITH THE UNIT

906

DETERMINE DIGITAL RIGHTS TO ASSOCIATE WITH THE NFT

908

ENTER THE DIGITAL RIGHTS OF THE NFT TO A DISTRIBUTED LEDGER NETWORK

910

EXECUTE A SMART CONTRACT THAT ASSIGNS AN OWNERSHIP OF AT LEAST ONE OF THE NFT OR THE DIGITAL RIGHTS TO A FIRST USER

912

RECEIVE A REQUEST TO PURCHASE AT LEAST ONE OF A TICKET ASSOCIATED WITH THE UNIT OR A RENT AGREEMENT ASSOCIATED WITH THE UNIT FROM A SECOND USER

914

EXECUTE A TRANSACTION ASSOCIATED WITH THE REQUEST FROM THE SECOND USER

916

ENTER A RECORD OF THE TRANSACTION TO THE DISTRIBUTED LEDGER NETWORK

FIG. 9

DIGITAL ASSET MANAGEMENT

RELATED APPLICATIONS

This application is a continuation of and claims priority to U.S. patent application Ser. No. 17/325,119, filed May 19, 2021, titled "DIGITAL ASSET MANAGEMENT," the entirety of which is incorporated herein by reference.

TECHNICAL FIELD

Assets that may be rented or purchased are subject to fraud via sales executed on black markets or other disreputable services. Current methods of managing and tracking asset sales often result in frustration and financial loss for many participants involved.

BRIEF DESCRIPTION OF THE DRAWINGS

Features of the present disclosure, its nature and various advantages, will be more apparent upon consideration of the following detailed description, taken in conjunction with the accompanying drawings. In the figures, the left-most digit(s) of a reference number identifies the figure in which the reference number first appears. The use of the same reference numbers in different figures indicates similar or identical items or features. The drawings are not to scale.

FIG. 7 illustrates an example process for associating a non-fungible token (NFT) with seat data and generating a smart contract.

FIG. 8 illustrates an example process for associating a NFT with a unit and generating a smart contract.

FIG. 9 illustrates another example process for associating a NFT with a unit and generating a smart contract.

DETAILED DESCRIPTION

Figure 1:
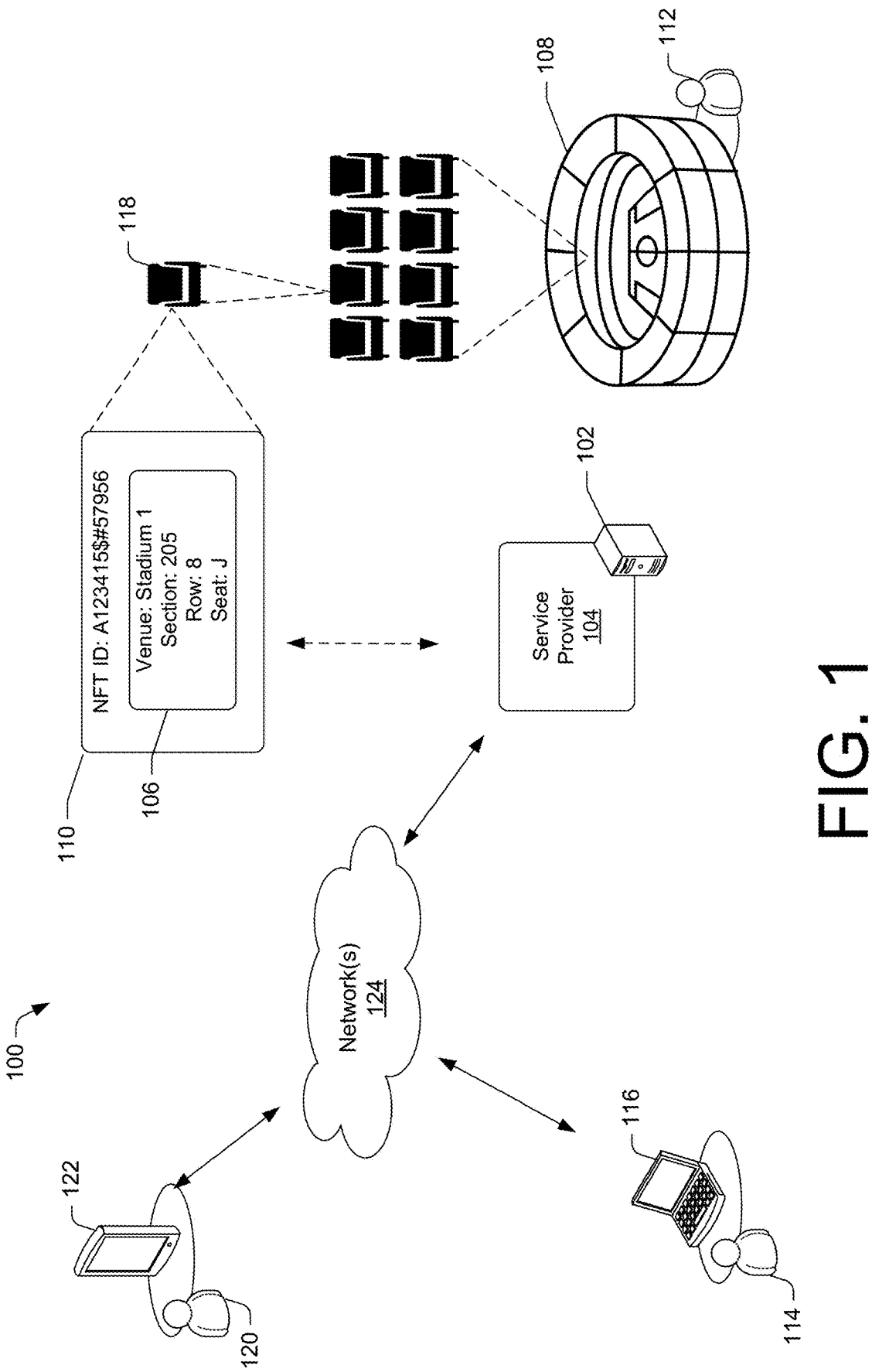
FIG. 1 illustrates an example environment for performing techniques described herein.

Techniques and methods for managing and tracking digital asset ownership are described herein. Physical assets, such as a seat or group of seats in a venue (e.g., sports stadium, concert hall, movie theater, etc.) or a housing unit or group of housing units (e.g., apartment, condominium, hotel room, etc.) may be tokenized and associated with a minted non-fungible token (NFT). The NFT may be entered into a distributed ledger such that, when the asset is involved in a transaction (e.g., rented, purchased, etc.), a record of the transaction is securely and permanently entered into the distributed ledger. By utilizing the NFT and the distributed ledger during transactions associated with the asset, all participants involved can be assured that proper and secure compensation is being provided for use of the asset.

In some examples, a service provider may receive seat data associated with a venue. A venue may include any structure containing seats and/or areas categorized by section, row, seat number, etc. The seat data may include the categorizing information as well as other types of information, such as a type of seat (e.g., bleacher, foldable, recliner, box seat, etc.), historical data associated with the seat, previous utilization of the seat, face-value data associated with the seat, etc. In some cases, the service provider may determine a value associated with each seat based on a location of the seat in the stadium. For example, a seat closer to the event being performed at the venue may be of a greater value than a seat further from the event.

In some cases, once the seat data is received by the service provider and values are determined for each seat, the service provider may generate (e.g., mint) NFTs to be associated with each seat. In some examples, the NFTs may be stored on a distributed ledger of the service provider. In some cases, each NFT may contain a smart contract that governs the rights, obligations, perks, stipulations, opportunities, and/or other information associated with owning the NFT. In some cases, the service provider may offer the NFTs for sale on behalf of an entity associated with the venue (e.g., owner, ownership group, etc.) and the smart contract may contain details regarding the rights of ownership of the NFT with respect to the purchaser of the NFT and the entity associated with the venue.

In some examples, the service provider may offer the NFTs on an individual basis (e.g., individual seats) while in other cases the service provider may offer groups of NFTs for purchase (e.g., groups of seats, rows, sections, etc.). For example, the entity associated with the venue may offer groups of NFTs for sale (e.g., via the service provider) as an initial investment to a program (e.g., sports team, event venue, etc.) associated with the venue. In this way, the entity associated with the venue may receive initial capital necessary to start a program (e.g., start a team, build a venue, repair a structure, etc.). Later, when events are ready to be performed at the venue (e.g., games, concerts, etc.), the service provider may offer individual NFTs to be resold from the initial investors to a public or consumer market.

In some cases, the service provider may offer the NFTs for sale on a website and/or application accessible via a user device, such as a computer, laptop, mobile device, etc. In some examples, individual NFTs or groups of NFTs may be fractionalized such that a user and/or a group of users may purchase a portion of the NFT and/or group of NFTs. Once an NFT and/or a group of NFTs has been purchased, the service provider may provide the payment for the NFT(s) to the entity associated with the venue. In some examples, after purchase of the NFT(s) the user may be subject to the smart contract associated with the purchased NFT(s). The smart contract may govern the rights, obligations, perks, stipulations, opportunities, and/or other information associated with the NFT(s) and the relationship between the user (i.e., the purchaser of the NFT(s)) and the entity associated with the venue. In some examples, the smart contract may obligate the user to indicate if the user will be utilizing the seat associated with the NFT themselves (e.g., season long usage of the seat during a sports season) or if the user will make the seat available for market use (e.g., allow tickets for the seat to be sold for events in the stadium). In some cases, the service provider may enable the user to specify particular dates and/or games in which the seat may be available to be sold on a ticket marketplace. In some examples, the service provider may enable the user to specify another user (e.g., friend, family member, etc.) who may have access to purchasing tickets for the seat.

In some examples, the service provider may operate a ticket marketplace (e.g., website, application, etc.) that may offer tickets for sale for the seats associated with the NFT(s) that have been purchased by users who does not intend to use the seat during each event and that indicated the seat will be available for any number of single tickets or season ticket purchases. In some cases, once the ticket for the seat has been sold, the service provider may provide proceeds (e.g., payment) to the owner of the NFT and/or the entity associated with the venue. For example, the smart contract associated with the NFT may specify a first portion (e.g., a first amount) of ticket sales proceeds to be provided to the owner of the NFT and a second portion (e.g., a second amount) of ticket sales proceeds to be provided to the entity associated with the venue. In some cases, once the user has purchased the ticket, the service provider may generate a machine-readable optical label (e.g., a bar code, QR code, etc.) associated with the ticket and may send the machine-readable optical label to the user who purchased the ticket so that the user may have access to the event.

In some cases, the service provider may operate an NFT exchange that enables users to sell, purchase, trade, and/or transfer NFT(s). In some cases, the smart contract may specify distribution of proceeds to be paid in the event that an NFT is involved in a transaction. For example, the smart contract may specify that the entity associated with the venue receives a portion (e.g., 5%, 10%, 15%, etc.) of the proceeds when an NFT is sold. In cases, where an NFT is involved in a transaction, the details of the transaction may be recorded by the service provider via the distributed ledger. In this way, proof of ownership remains on the distributed ledger and the smart contract can never be removed or tampered with.

In some cases, the service provider may associate an NFT with a property unit, such as a hotel room, apartment, condominium, etc. For example, the service provider may receive unit data including categorizing information of the unit (address, floor number, room number, etc.) as well as other types of information, such as a room type (e.g., number of rooms, number of bathrooms, etc.). In some cases, the service provider may determine a value associated with each unit based on a location of the unit in a building. For example, a unit closer to the top of a building may be of a greater value than a ground floor unit.

In some cases, once the unit data is received by the service provider and values are determined for each unit, the service provider may generate (e.g., mint) NFTs to be associated with each unit. In some examples, the NFTs may be stored on a distributed ledger of the service provider. In some cases, each NFT may contain a smart contract that governs the rights, obligations, perks, stipulations, opportunities, and/or other information associated with owning the NFT. In some cases, the service provider may offer the NFTs for sale on behalf of an entity associated with the building or structure that houses the unit (e.g., owner, ownership group, etc.) and the smart contract may contain details regarding the rights of ownership of the NFT with respect to the purchaser of the NFT and the entity associated with the structure.

In some examples, the service provider may operate a unit marketplace (e.g., website, application, etc.) that may offer access to the units associated with the NFT(s) that have been purchased by users who does not intend to use the unit that indicated the unit will be available for use. In some cases, once access to the unit has been sold, the service provider may provide proceeds (e.g., payment) to the owner of the NFT and/or the entity associated with the structure. For example, the smart contract associated with the NFT may specify a first portion (e.g., a first amount) of sales proceeds to be provided to the owner of the NFT and a second portion (e.g., a second amount) of sales proceeds to be provided to the entity associated with the structure. In some cases, once the user has purchased the access to the unit, the service provider may generate a machine-readable optical label (e.g., a bar code, QR code, etc.) associated with the unit and may send the machine-readable optical label to the user who purchased the access to the unit.

The service provider can provide multiple services, each of which can enable users to participate in digital asset ownership. Examples of such services include an NFT generation service, an NFT exchange service, a ticket marketplace service, a unit marketplace service, a distributed ledger service (to allow the NFTs to be managed via distributed ledger technologies), a contracts service (e.g., for managing contracts between the user and other entities), a reservation service (e.g., for managing reservations), a payment processing service (e.g., for processing payments on behalf of the user), and/or the like. In some examples, a user can utilize individual platforms associated with the services to communicate with other users.

As described herein, machine learned models may be generated using various machine learning techniques. For example, the models may be generated using one or more neural network(s). A neural network may be a biologically inspired algorithm or technique which passes input data through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from data. In some cases, the neural network may be a trained network architecture that is end-to-end. In one example, the machine learned models may include segmenting and/or classifying extracted deep convolutional features of data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, ResNext101, VGG, DenseNet, PointNet, CenterNet and the like. In some cases, the system may also apply Gaussian blurs, Bayes Functions, color analyzing or processing techniques and/or a combination thereof.

In some cases, the term "NFT" may be used to indicate any unit of data stored on a distributed ledger (e.g., a blockchain), that certifies a digital asset to be unique and therefore not interchangeable.

FIG. 1 illustrates an example environment 100 for performing techniques described herein. In at least one example the environment 100 can include server computing device(s) (e.g., server(s) 102) that can be associated with a service provider 104. The service provider 104 can provide one or more services. Examples of such services include an NFT generation service, an NFT exchange service, a ticket marketplace service, a unit marketplace service, a distributed ledger service (to allow the NFTs to be managed via distributed ledger technologies), a contracts service (e.g., for managing contracts between the user and other entities), a reservation service (e.g., for managing reservations), a payment processing service (e.g., for processing payments on behalf of the user), and/or the like.

In at least one example, service provider 104 may receive seat data 106 associated with a venue 108. The venue 108 may include any structure containing seats and/or areas categorized by section, row, seat number, etc. The seat data 106 may include the categorizing information as well as other types of information, such as a type of seat (e.g., bleacher, foldable, recliner, box seat, etc.), historical data associated with the seat, previous utilization of the seat, face-value data associated with the seat, etc. In some cases, the service provider 104 may determine a value associated with each seat based on a location of the seat in the venue 108. For example, a seat closer to the event being performed at the venue 108 may be of a greater value than a seat further from the event. In some cases, the service provider 104 may determine a suggested price range for each seat and/or an NFT associated with the seat in the venue 108 based on the seat data 106.

In some cases, once the seat data 106 is received by the service provider 104 and values are determined for each seat, the service provider 104 may generate (e.g., mint) NFTs to be associated with each seat, such as an NFT 110 (herein referred to as "NFT(s) 110, "NFTs 110, or "NFT 110"). In some examples, the NFTs 110 may be stored on a distributed ledger of the service provider 104. In some cases, each NFT 110 may contain a smart contract that governs the rights, obligations, perks, stipulations, opportunities, and/or other information associated with owning the NFT 110. By way of example, an obligation stipulated in the smart contract may include requiring the user 114 to purchase a season ticket for the seat 118 or indicating that the seat 118 is available for market use. In some cases, the service provider 104 may offer the NFTs 110 for sale on behalf of an entity 112 associated with the venue 108 (e.g., owner, ownership group, etc.) and the smart contract may contain details regarding the rights of ownership of the NFT 110 with respect to a user 114 who may be purchasing the NFT 110 (e.g. a purchaser) and the entity 112 associated with the venue 108.

In some examples, the service provider 104 may offer the NFTs 110 on an individual basis (e.g., individual seats) while in other cases the service provider 104 may offer groups of NFTs 110 for purchase (e.g., groups of seats, rows, sections, etc.). For example, the entity 112 associated with the venue 108 may offer groups of NFTs 110 for sale as an initial investment to a program (e.g., sports team) associated with the venue 108. In this case, a group of NFTs 110 representing a group of seats (e.g., a section) of the venue 108 may be available for purchase in bulk to a purchaser, such as the user 114.

In some cases, the service provider 104 may offer the NFTs 110 for sale on a website and/or application accessible via a user device 116 (e.g., a computer, laptop, mobile device, etc.). In some examples, the user device 116 can be configured to communicate with the server(s) 102 over one or more networks (e.g., network(s) 124). In some examples, the user device 116 can have one or more applications stored thereon that can specially configure the user device 116 to communicate with the server(s) 102. In some examples, the one or more applications can be provided by the service provider 104 (e.g., to access one or more services associated therewith). In some examples, each application can be associated with a service provided by the service provider 104. In some examples, an application can be associated with multiple services provided by the service provider 104. In some examples, the user 114 can access service(s) of the service provider 104 via a web browser or other access point. As used herein, a "platform" can comprise computing components (e.g., software and a surrounding ecosystem of resources) associated with service(s) provided by the service provider 104. While a single user 114 is illustrated, any number of users can be present in the environment 100.

In some cases, the NFTs 110 may be for sale via an interface (e.g., displayed on the user device 116) showing a dynamic, time-sensitive display of available NFTs and the seat associated with the NFT and the price associated with the NFT. In some cases, the display may update automatically as NFTs are purchased by other users. For example, the display may present a number of seats within a stadium and the relative location of the seats to one another in the stadium. The display may enable the user to select the seat within the stadium in order to purchase the NFT associated with the seat.

In some examples, individual NFTs 110 or groups of NFTs 110 may be fractionalized such that the user 114 and/or a group of users 114 may purchase a portion of the NFT 110 and/or group of NFTs 110. Once an NFT 110 and/or a group of NFTs 110 has been purchased, the service provider 104 may provide the payment for the NFT(s) 110 to the entity 112 associated with the venue 108. In some examples, after purchase of the NFT(s) 110 the user 114 may be subject to the smart contract associated with the purchased NFT(s) 110. The smart contract may govern the rights, obligations, perks, stipulations, opportunities, and/or other information associated with the NFT(s) 110 and the relationship between the user 114 (i.e., the purchaser of the NFT(s) 110) and the entity 112 associated with the venue 108. In some examples, the smart contract may obligate the user 114 to indicate if the user 114 will be utilizing the seat associated with the NFT 110 themselves (e.g., season long usage of the seat during a sports season) or if the user 114 will make the seat available for market use (e.g., allow tickets for the seat to be sold for events in the venue 108). In some cases, the service provider 104 may enable the user 114 to specify particular dates and/or games in which tickets for the seat, such as a seat 118 associated with the NFT 110, may be available to be sold on a ticket marketplace. In some examples, the service provider 104 may enable the user 114 to specify another user (e.g., friend, family member, etc.) who may have access to purchasing tickets for the seat 118.

In some examples, the service provider 104 may operate a ticket marketplace (e.g., website, application, etc.) that may offer tickets for sale for the seats associated with the NFT(s) 110 that have been purchased by users 114 who does not intend to use the seat 118 during each event and that indicated the seat 118 will be available for any number of single tickets or season ticket purchases. In one example, the service provider 104 may offer the ticket marketplace to a user 120 via user device 122 operating on a network 124. In some cases, once the ticket for the seat 118 has been sold, the service provider 104 may provide proceeds (e.g., payment) to the owner of the NFT 110 (e.g., the user 114) and/or the entity 112 associated with the venue 108 based at least in part on querying the smart contract associated with the NFT 110. For example, the smart contract associated with the NFT 110 may specify a first portion (e.g., a first amount) of ticket sales proceeds to be provided to owner of the NFT 110 (e.g., the user 114) and a second portion (e.g., a second amount) of ticket sales proceeds to be provided to the entity 112 associated with the venue 108. In some cases, once the user 120 has purchased the ticket, the service provider 104 may generate a machine-readable optical label (e.g., a bar code, QR code, etc.) associated with the ticket and may send the machine-readable optical label to the device 122 of the user 120 who purchased the ticket so that the user 120 may have access to the event. In some examples, when a ticket for the seat 118 that is associated with the NFT 110 is involved in a transaction (e.g., sold, bought, traded, etc.), the details of the transaction may be recorded by the service provider 104 via the distributed ledger. In this way, a proof of ownership of the seat 118 and the NFT 110 may be verified whenever a ticket for the seat 118 is sold, thereby ensuring that proceeds from the transaction are allocated to the appropriate entities (e.g., the owner of the NFT user 114 and/or the entity 112 associated with the venue 108), as opposed to black market vendors.

In some cases, a ticket for the seat associated with the NFT 110 may be sold for less than a predetermined value (e.g., a face-value of what a ticket for the seat may be worth). In this cases, the service provider 104 may determine an alternate distribution of proceeds to be provided to the user 114, the entity 112, and/or the service provider 104. For example, the service provider 104 may not provide any proceeds to the entity 112. In some cases, the service provider 104 may charge a percentage gain (10%) of the purchase to the entity 112 as a fee for providing the service. In some cases, the service provider 104 may charge a predetermined fee (e.g., 10$ per sale) to the entity 112 as a fee for providing the service.

In some cases, the service provider 104 may operate an NFT exchange that enables users, such as the user 114 and/or the user 120, to sell, purchase, trade, and/or transfer NFT(s) 110. In some cases, the smart contract may specify distribution of proceeds to be paid in the event that an NFT 110 is involved in a transaction. For example, the smart contract may specify that the entity 112 associated with the venue receives a portion (e.g., 5%, 10%, 15%, etc.) of the proceeds when an NFT 110 is sold. In cases, where an NFT 110 is involved in a transaction, the details of the transaction may be recorded by the service provider 104 via the distributed ledger. In this way, proof of ownership of the NFT 110 remains on the distributed ledger and the smart contract can never be removed or tampered with. It is to be understood that, although the example above discusses a portion of proceeds to be paid to the entity 112 associated with the venue 108, the smart contract may specify any other entity to receive proceeds based on a transaction associated with the NFT 110. For example, the service provider 104 may receive a portion of the proceeds when an NFT 110 is associated with a transaction (e.g., a ticket associated with the NFT 110 is sold, a unit associated with the NFT 110 is involved in a transaction, an NFT 110 is sold, an NFT 110 is traded, etc.).

The user device 116 and the user device 122 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The server(s) 102 can be one or more servers or other types of computing devices that can be embodied in any number of ways. For example, in the example of a server, components, other functional components, and/or data can be implemented on a single server, a cluster of servers, a server farm or data center, a cloud-hosted computing service, a cloud-hosted storage service, and so forth, although other computer architectures can additionally or alternatively be used.

In some examples, a model can be trained based at least in part on previous communications associated with users 114, users 120, and the entity 112 that interact with of the service provider 104. Such communications can be associated with metadata indicating content of such communications, date and/or time of such communications, communication channels and/or platforms associated with such communications, users associated with such communications, and/or the like. Such data can be used to train a model, for example using machine learning mechanisms. The resulting machine-trained model can be a statistical classifier, a neural network, or the like. The machine-trained model can output one or more classes, wherein each class represents a different communication channel or platform. In some examples, such classes can be representative of different identifiers of an individual user, wherein each identifier corresponds to a different communication channel (e.g., email address/email, phone number/text message, identifier/social media platform, etc.). Classes can be ranked or otherwise arranged such to identify the recommended communication channel and/or platform for routing a communication.

In some cases, the service provider 104 may store user profiles that can be associated with, data associated with users 114, users 120, and the entity 112. For instance, a user profile can store, or otherwise be associated with, information about a user (e.g., name of the user, geographic location of the user, operating hours of the user, user preferences (e.g., learned or user-specified), identifier(s) of the user (which can be associated with different communication channels and/or platforms), etc.), a user category classification (NFT purchaser, ticket purchaser, entity associate with a venue, etc.), hardware (e.g., device type) used by the user, transaction data associated with the user (e.g., transactions conducted by the user, payment data associated with the transactions, items associated with the transactions, descriptions of items associated with the transactions, itemized and/or total spends of each of the transactions, parties to the transactions, dates, times, and/or locations associated with the transactions, etc.), risk information associated with the user (e.g., indications of risk, instances of fraud, chargebacks, etc.), reservations data (e.g., previous reservations, upcoming (scheduled) reservations, interactions associated with such reservations, etc.), inventory data, customer service data, messaging data, etc. A user profile can securely store bank account information as provided by the user. In some examples, a user profile can include user preferences with respect to which communication channel(s) and/or platform(s) they prefer to use for communication, which identifier(s) associated with communication channel(s) they prefer to use for communication, etc. In some examples, historical communication data associated with a user (e.g., communications sent, communications received, responses, response time, etc.) can be associated with a user profile.

Figure 2:
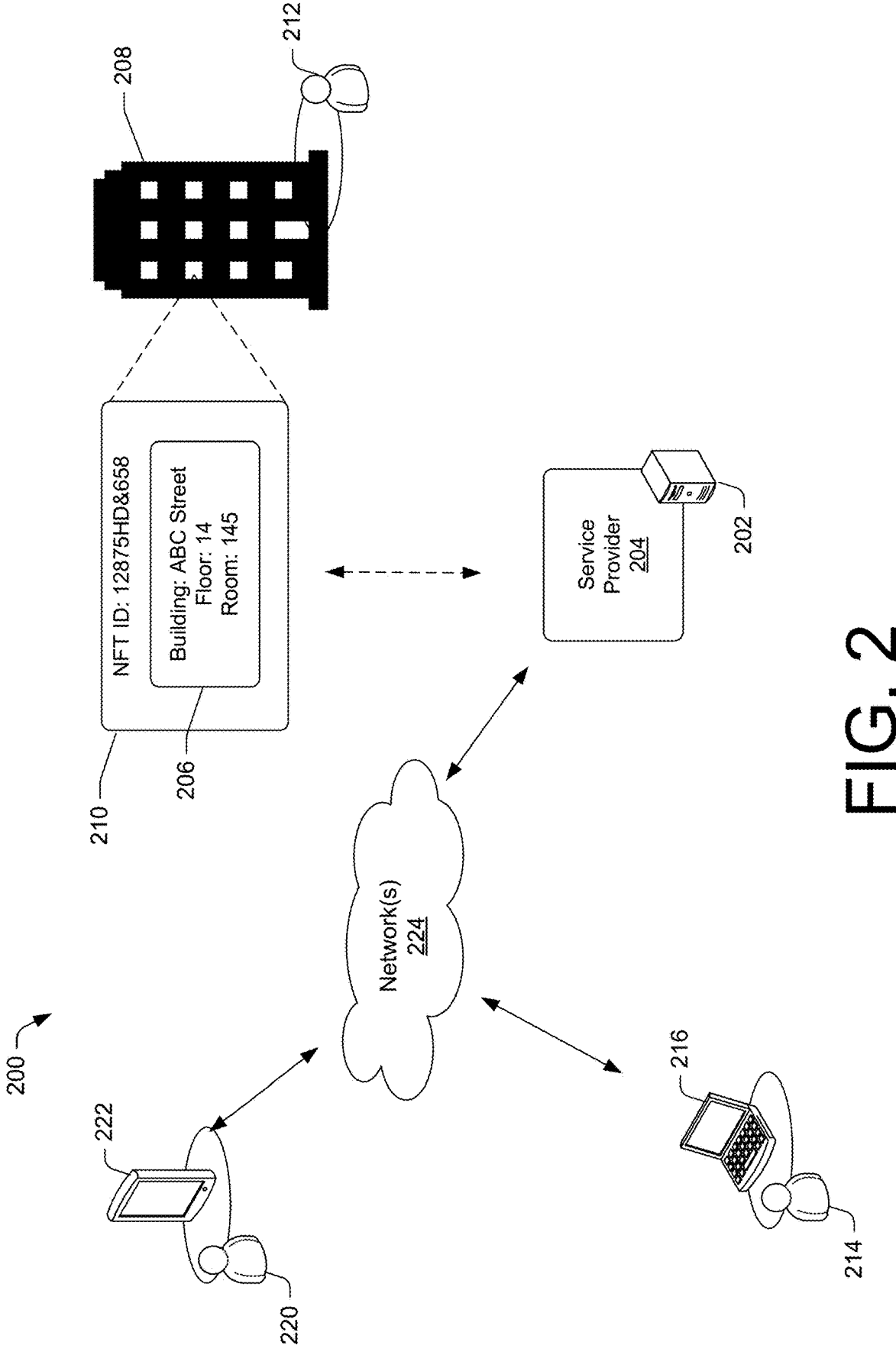
FIG. 2 illustrates another example environment for performing techniques described herein.

FIG. 2 illustrates an example environment 200 for performing techniques described herein. In at least one example the environment 200 can include server(s) 202, a service provider 204, an NFT 210, an entity 212, a user 214, a user device 216, a user 220, a user device 222, and network(s) 224, which may be the same or similar to the server(s) 102, the service provider 104, the NFT 110, the entity 112, the user 114, the user device 116, the user 120, the user device 122, and the network(s) 124 as described above with regard to FIG. 1. Environment 200 may also include a structure 208 and unit data 206. In some cases, the service provider 204 may associate an NFT 210 with a property unit, such as a hotel room, apartment, condominium, etc. For example, the service provider 204 may receive unit data 206 including categorizing information of the unit (address, floor number, room number, etc.) as well as other types of information, such as a room type (e.g., number of rooms, number of bathrooms, etc.) located with a structure 208. In some cases, the service provider 204 may determine a value associated with each unit based on a location of the unit in a structure 208. For example, a unit closer to the top of a structure 208 may be of a greater value than a ground floor unit.

In some cases, once the unit data 206 is received by the service provider 204 and values are determined for each unit, the service provider 204 may generate (e.g., mint) NFTs 210 to be associated with each unit. In some examples, the NFTs 210 may be stored on a distributed ledger of the service provider 204. In some cases, each NFT 210 may contain a smart contract that governs the rights, obligations, perks, stipulations, opportunities, and/or other information associated with owning the NFT 210. By way of example, an obligation stipulated in the smart contract may include requiring the user 214 to purchase a rental agreement for the unit or indicating that the unit is available for market use. In some cases, the service provider 204 may offer the NFTs 210 for sale on behalf of the entity 212 associated with the structure 208 (e.g., owner, ownership group, etc.) and the smart contract may contain details regarding the rights of ownership of the NFT 210 with respect to a user 214 that may purchase the NFT 210 via the device 216 and the entity 212 associated with the structure 208. In some cases, purchasing the NFT 210 allows the user 214 rights to access the unit associated with the particular NFT 210 assigned to that unit.

In some examples, the service provider 204 may operate a unit marketplace (e.g., website, application, etc.) that may offer access to the units associated with the NFT(s) 210 that have been purchased by users 214 who does not intend to use the unit and that indicated the unit will be available for use. In some cases, once access to the unit has been sold to another user 220 via a user device 222 accessing the unit marketplace, the service provider 204 may provide proceeds (e.g., payment) to the use 214 (e.g., the owner of the NFT 210) and/or the entity 212 associated with the structure 208. For example, the smart contract associated with the NFT 210 may specify a first portion (e.g., a first amount) of sales proceeds to be provided to the use 214 (e.g., the owner of the NFT 210) and a second portion (e.g., a second amount) of sales proceeds to be provided to the entity 212 associated with the structure 208. In some cases, once the user 220 has purchased the access to the unit, the service provider 204 may generate a machine-readable optical label (e.g., a bar code, QR code, etc.) associated with the unit and may send the machine-readable optical label to the user 220 who purchased the access to the unit.

Figure 3:
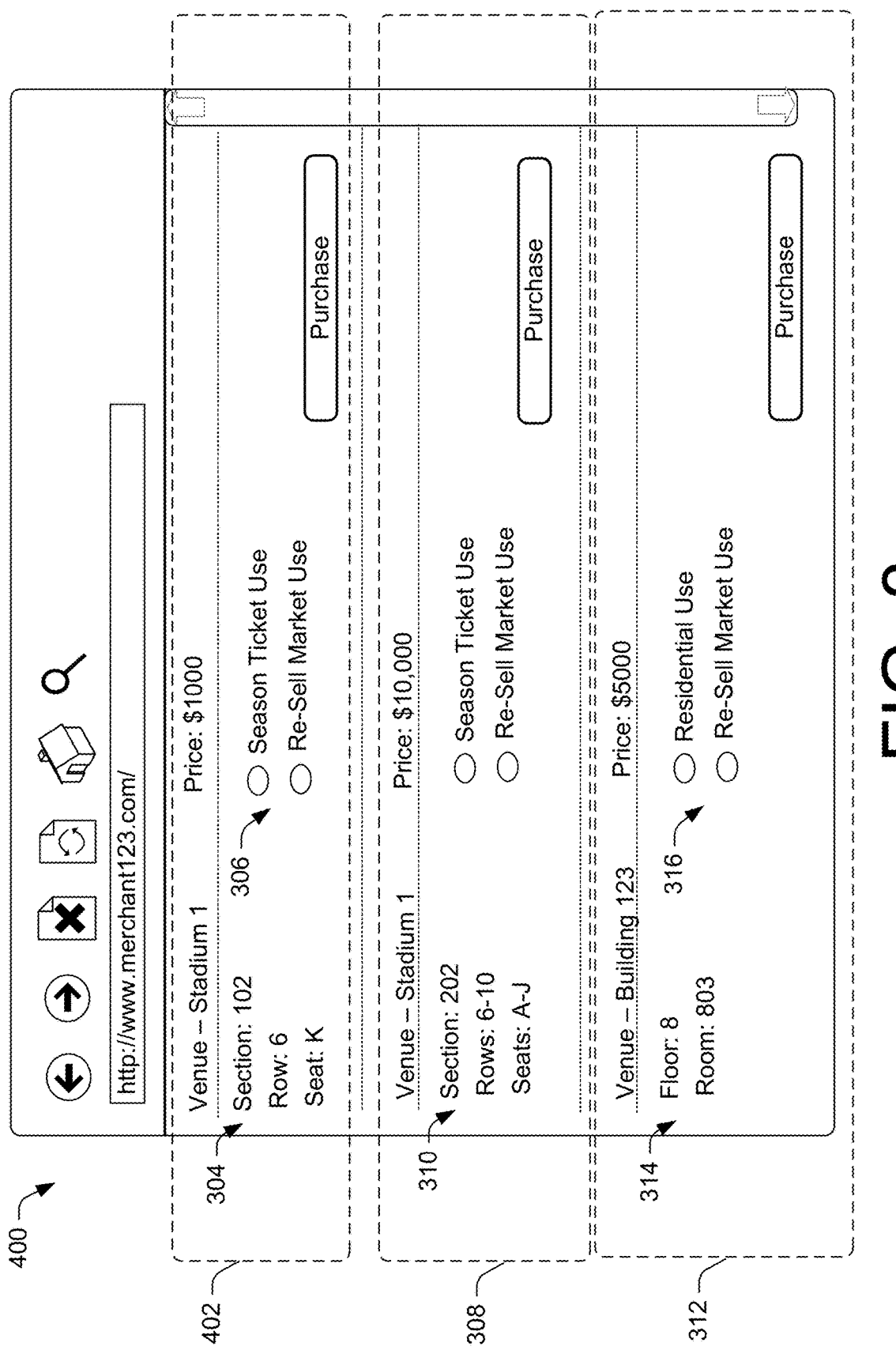
FIG. 3 illustrates an example user interface of a digital asset marketplace, as described herein.

FIG. 3 illustrates an example of a user interface 300 that can present a digital asset (e.g., NFT) marketplace presented by a service provider, such as the service provider 104, as described herein. In at least one example, the user interface 300 can be presented via an application on the user device 116, a web browser on the user device 116, a user device 216, and/or the like, as a web interface, mobile interface, an instant application, or a progressive web application.

In one example, a section 302 of the interface 300 enables a user, such as the user 114 or user 214 to purchase an NFT associated with an individual seat of a venue. The section 302 may include seat data 304 (e.g., venue name, section, row, seat number, etc.) describing details of the seat, such as a location within the venue. In some cases, the seat data may include other types of information, such as a type of seat (e.g., bleacher, foldable, recliner, box seat, etc.).

In some examples, the interface 300 may include a section 306 requesting the user to indicate if the user will be utilizing the seat associated with the NFT themselves (e.g., season long usage of the seat during a sports season) or if the user will make the seat available for market use (e.g., allow tickets for the seat to be sold for events in the stadium). In some cases, the interface 300 presented by the service provider may enable the user to specify particular dates and/or games in which the seat may be available to be sold. In some examples, the interface 300 presented by the service provider may enable the user to specify another user (e.g., friend, family member, etc.) who may have access to purchasing tickets for the seat. In cases, where an NFT is involved in a transaction, the details of the transaction may be recorded by the service provider via a distributed ledger. In this way, proof of ownership of the NFT remains on the distributed ledger and the smart contract can never be removed or tampered with.

In one example, a section 308 of the interface 300 enables a user, such as the user 114 or user 214 to purchase a group of NFTs associated with a group of seats (e.g., a block of seats) of a venue. The section 308 may include seat data 310 (e.g., venue name, section, rows, seat numbers, etc.) describing details of the group of seats, such as a location within the venue. In some cases, the seat data may include other types of information, such as a type of seats (e.g., bleacher, foldable, recliner, box seat, etc.).

In one example, a section 312 of the interface 300 enables a user, such as the user 114 or user 214 to purchase an NFT associated with a unit of a structure. The section 312 may include unit data 314 including categorizing information of the unit (address, floor number, room number, etc.) as well as other types of information, such as a room type (e.g., number of rooms, number of bathrooms, etc.) located with a structure. In some cases, the unit data may include other types of information.

In some examples, the interface 300 may include a section 316 requesting the user to indicate if the user will be accessing the unit associated with the NFT themselves or if the user will make the unit accessible for market use (e.g., allow the unit to be rented). In some cases, the interface 300 presented by the service provider may enable the user to specify particular dates and/or games in which the unit may be available to be rented. In some examples, the interface 300 presented by the service provider may enable the user to specify another user (e.g., friend, family member, etc.) who may have access to purchasing access to the unit.

In some examples, although interface 300 illustrates sections 302, 308, and 312 on a single interface, each section may be presented on a different interface and/or as a different marketplace service. For example, sections 302 and 308 may be associated with a digital asset marketplace for seats while section 312 may be associated with a digital asset marketplace for units, both of which may be presented and/or operated by the service provider 104. Transactions for digital assets (e.g., NFTs), associated with seats, units, and/or other tangible assets (e.g., artwork, vehicles, plane seats, bus seats, train seats, etc.) may be recorded by the service provider 104 via a distributed ledger.

In at least one example, the one or more elements can be associated with respective actuation mechanisms, such that an input associated with one of the one or more elements can cause a corresponding user interface, or portion thereof, to be presented via the user interface 300, or a portion thereof.

Figure 4:
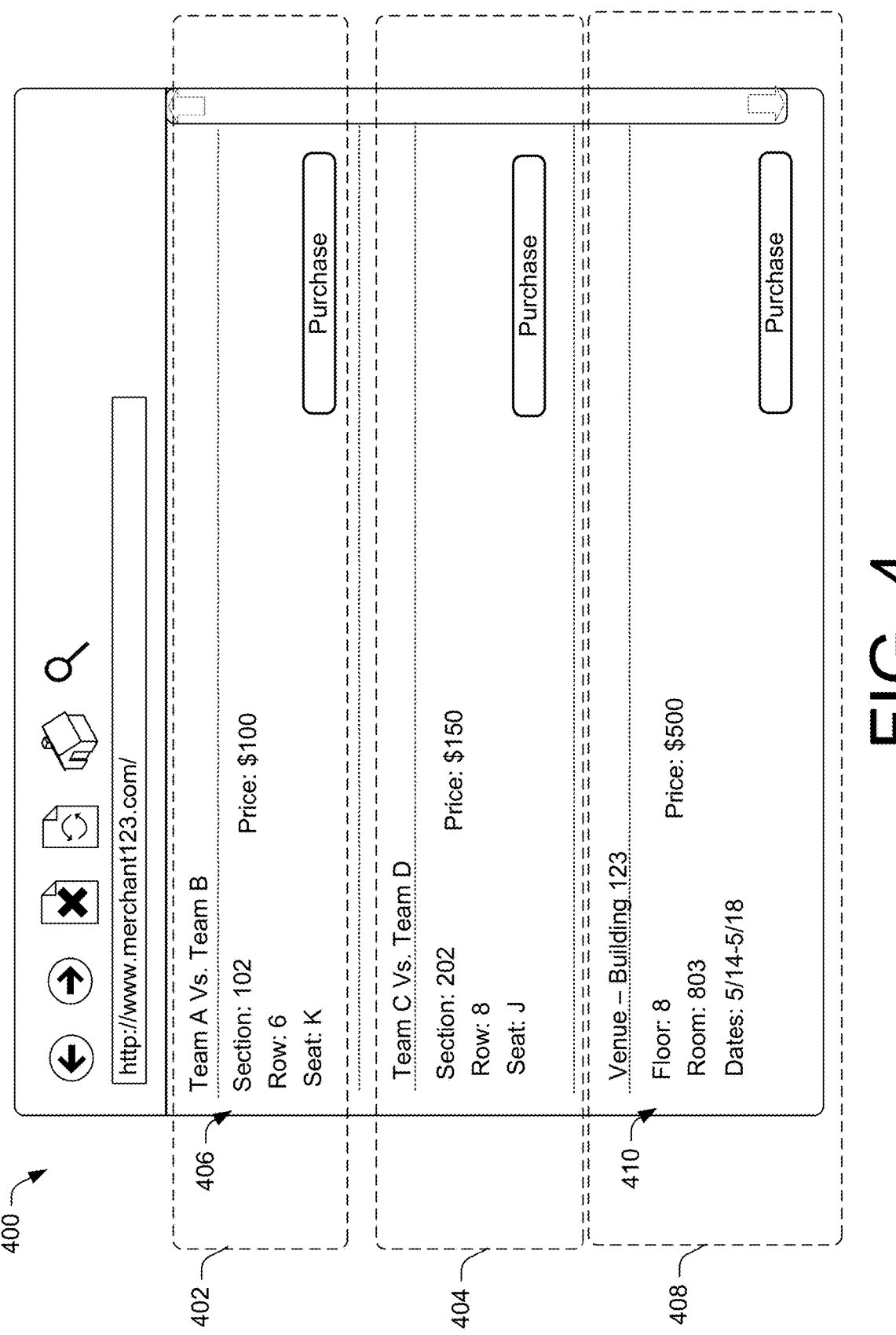
FIG. 4 illustrates another example user interface of a digital asset marketplace, as described herein.

FIG. 4 illustrates an example of a user interface 400 that can present a marketplace presented by a service provider, such as the service provider 104, as described herein. In at least one example, the user interface 300 can be presented via an application on the user device 122, a web browser on the user device 122, a user device 222, and/or the like, as a web interface, mobile interface, an instant application, or a progressive web application. The items presented for sale on the interface 400 include items that are physically accessible, such as access to seats at a venue, access to a unit in a building, etc.

In one example, sections 402 and 404 of the interface 400 enables a user, such as the user 120 or user 220 to purchase a ticket for a seat associated with an NFT. The section 402 may include seat data 406 (e.g., event data, section, row, seat number, etc.) describing details of the seat and/or the event. In some cases, the seat data may include other types of information, such as a type of seat (e.g., bleacher, foldable, recliner, box seat, etc.).

In one example, a section 408 of the interface 400 enables a user, such as the user 120 or user 220 to purchase access to a unit associated with an NFT. The section 408 may include unit data 410 including categorizing information of the unit (address, floor number, room number, etc.) as well as other types of information, such as a room type (e.g., number of rooms, number of bathrooms, etc.) located with a structure. In some cases, the unit data may include other types of information.

In some examples, although interface 400 illustrates sections 402, 404, and 408 on a single interface, each section may be presented on a different interface and/or as a different marketplace service. For example, sections 402 and 404 may be associated with a ticket marketplace for seat tickets while section 408 may be associated with a unit marketplace for units, both of which may be presented and/or operated by the service provider 104. Transactions for digital assets (e.g., NFTs), associated with seats, units, and/or other tangible assets (e.g., artwork, vehicles, plane seats, bus seats, train seats, etc.) may be recorded by the service provider 104 via a distributed ledger.

In at least one example, the one or more elements can be associated with respective actuation mechanisms, such that an input associated with one of the one or more elements can cause a corresponding user interface, or portion thereof, to be presented via the user interface 400, or a portion thereof.

In some cases, once a ticket for the seat has been sold, the service provider 104 may provide proceeds (e.g., payment) to the owner of the NFT associated with the ticket (e.g., the user 114) and/or the entity associated with the venue in which the seat is located. For example, the smart contract associated with the NFT may specify a first portion (e.g., a first amount) of ticket sales proceeds to be provided to owner of the NFT (e.g., the user 114) and a second portion (e.g., a second amount) of ticket sales proceeds to be provided to the entity associated with the venue. In some cases, once the user has purchased the ticket via the interface 400, the service provider 104 may generate a machine-readable optical label (e.g., a bar code, QR code, etc.) associated with the ticket and may send the machine-readable optical label to the device of the user who purchased the ticket so that the user may have access to the event. In some examples, when a ticket for the seat that is associated with the NFT is involved in a transaction (e.g., sold, bought, traded, etc.), the details of the transaction may be recorded by the service provider 104 via the distributed ledger. In this way, a proof of ownership of the seat and the NFT may be verified whenever a ticket for the seat is sold, thereby ensuring that proceeds from the transaction are allocated to the appropriate entities (e.g., the owner of the NFT user and/or the entity associated with the venue), as opposed to black market vendors.

Figure 5:
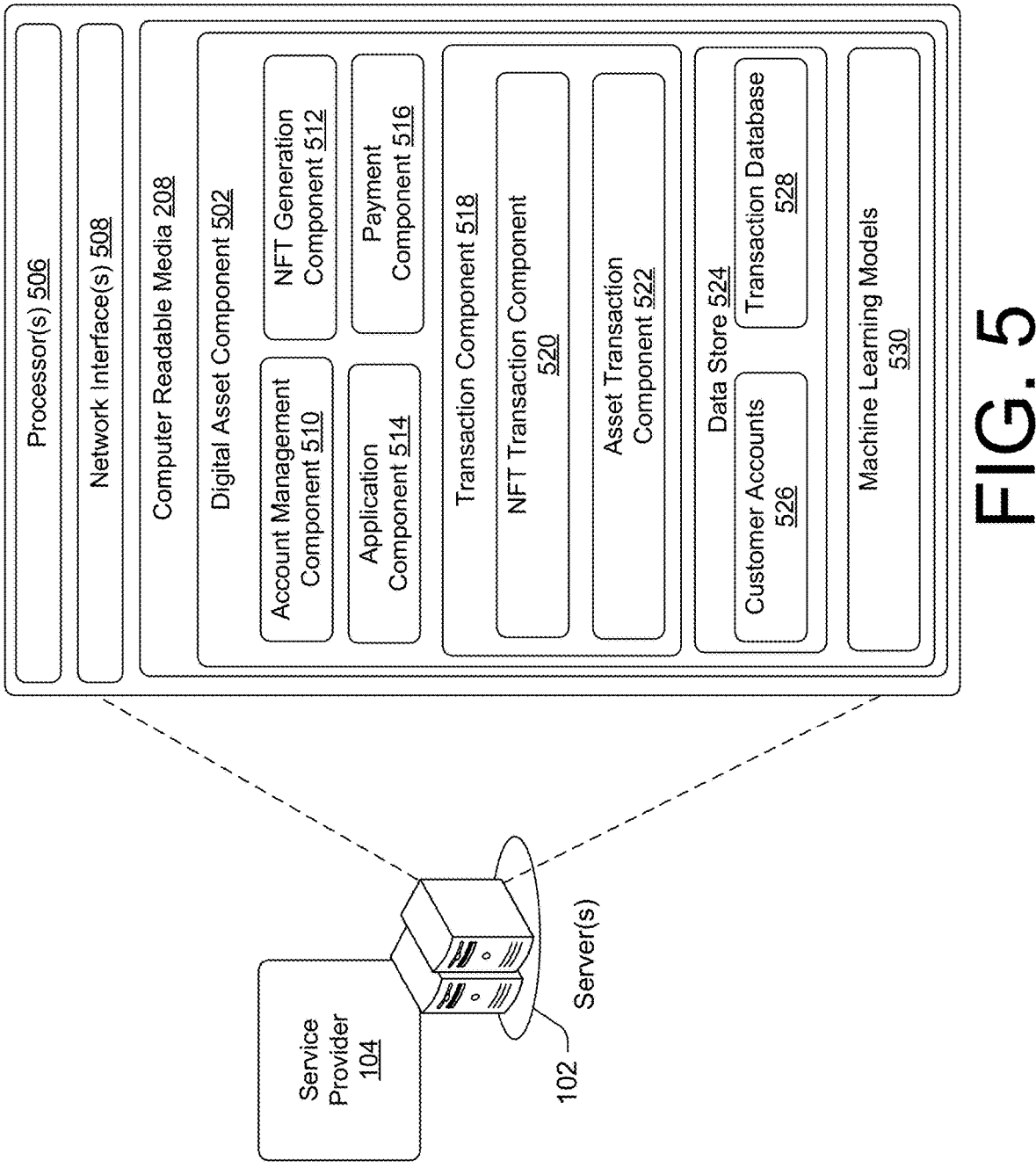
FIG. 5 illustrates a schematic diagram of illustrative components in an example server of a service provider.

FIG. 5 is a schematic diagram of illustrative components in an example server 102 that facilitates ownership of digital assets. A digital asset component 502 may be implemented by the one or more servers 102. In some cases, the servers 102 may be associated with the service provider 104. The servers 102 may be equipped with network interfaces 504, processor(s) 506, and non-transitory computer readable media 508. The network interfaces 504 may include wireless and/or wireless communication interface components that enable the servers 102 to transmit and receive data via a network. In various embodiments, the wireless interface component may include, but is not limited to, cellular, Wi-Fi, Ultra-wideband (UWB), Bluetooth, satellite transmissions, and so forth. The wired interface component may include a direct input/output (I/O) interface, such as an Ethernet interface, a serial interface, a Universal Serial Bus (USB) interface, and/or so forth.

The computer readable media 508 may include non-transitory computer-readable storage media, which may include hard drives, floppy diskettes, optical disks, CD-ROMs, DVDs, read-only memories (ROMs), random access memories (RAMs), EPROMS, EEPROMS, flash memory, magnetic or optical cards, solid-state memory devices, or other types of storage media suitable for storing electronic instructions.

The digital asset component 502 may include an account management component 510, an NFT generation component 512, an application component 514, a payment component 516, a transaction component 518, an NFT transaction component 520, an asset transaction component 522, a data store 524, customer accounts 526, a transaction database 528, and machine learning models 530. Accordingly, each component of the digital asset component 502 is discussed herein in turn.

The account management component 510 may enable users, such as the user 114, the user 120, and/or the entity 112 to create customer accounts 526 (e.g., user accounts). The user may establish a corresponding customer account by providing registration information to the account management component 510 via an electronic device, such as the user device 116 and/or the user device 122. The registration information may include a customer name, a customer address, customer contact information, a login name, a password, and so forth. Each of the customer accounts 526 may also include account access information for one or more financial accounts that a corresponding customer provided for paying purchase transactions. In various embodiments, the account management component 510 may provide authentication functions that control access to the customer accounts 526.

The NFT generation component 512 may generate NFTs that can be associated with physical assets and be stored in a distributed ledger, such as the transaction database 528. For example, once the seat data and/or the unit data is received by the service provider and values are determined for each seat and/or unit, the service provider may generate (e.g., mint) NFTs to be associated with each seat and/or unit. In some examples, the NFTs may be stored on a distributed ledger of the service provider. In some cases, each NFT may contain a smart contract that governs the rights, obligations, perks, stipulations, opportunities, and/or other information associated with owning the NFT. In some cases, the service provider may offer the NFTs for sale on behalf of an entity associated with the venue and/or structure (e.g., owner, ownership group, etc.) and the smart contract may contain details regarding the rights of ownership of the NFT with respect to the purchaser of the NFT and the entity associated with the venue and/or structure. In some cases, the smart contract may stipulate how proceeds are to be disbursed (e.g., between the user 114 and the entity 112) when a transaction occurs with the physical item associated with the NFT.

The application component 514 may store a number of applications that are configured to provide access to services provided by the service provider 104. For example, the application component 514 may store and/or provide applications to user devices (e.g., user device 116 and/or user device 122) to facilitate transactions associated with NFTs and/or assets associated with NFTs.

The payment component 516 may use funds and/or payment information (e.g., credit card number) in the customer account 526 to make payments associated with NFTs and/or assets associated with NFTs.

The transaction component 518 may handle the processing of transactions for the acquisition of NFTs and/or access to the assets associated with the NFTs. Each of the transactions may include transaction details, such as a purchase order number, a name of each item purchased, a description of each item, a cost of each item, a number of each item purchased, a purchase total, and so forth. The transaction component 518 may obtain payment for the purchase of a product from a financial account of a user, such as the user 114, the user 120, and/or the entity 112. A financial account may be a checking account, a savings account, a debit card account, a credit card account, a stored value card account, a charge card account, a gift card account, and/or the like. In some instances, a user may also have arranged to have funds directly deposited in a corresponding customer account, such as one of customer accounts 526. Thus, in such instances, the transaction component 518 may alternatively or concurrently arrange for the funding of a purchase transaction using funds stored in a customer account of a user. The transaction component 518 may include an NFT transaction component 520 and an asset transaction component 522. The NFT transaction component 520 may handle transactions associated with, buying, selling, and/or trading, NFTs. For example, the service provider may offer the NFTs on an individual basis (e.g., individual seats) while in other cases the service provider may offer groups of NFTs for purchase (e.g., groups of seats, rows, sections, etc.). For example, the entity associated with the venue may offer groups of NFTs for sale as an initial investment to a program (e.g., sports team) associated with the venue.

In some cases, the service provider, via the NFT transaction component 520, may offer the NFTs for sale on a website and/or application accessible via a user device, such as a computer, laptop, mobile device, etc. In some examples, individual NFTs or groups of NFTs may be fractionalized such that a user and/or a group of users may purchase a portion of the NFT and/or group of NFTs.

In some examples, the service provider, via the asset transaction component 522, may operate a ticket marketplace (e.g., website, application, etc.) that may offer tickets for sale for the seats associated with the NFT(s) that have been purchased by users who does not intend to use the seat during each event and that indicated the seat will be available for any number of single tickets or season ticket purchases. In some cases, once the ticket for the seat has been sold, the service provider may provide proceeds (e.g., payment) to the owner of the NFT and/or the entity associated with the venue. For example, the smart contract associated with the NFT may specify a first portion (e.g., a first amount) of ticket sales proceeds to be provided to the owner of the NFT and a second portion (e.g., a second amount) of ticket sales proceeds to be provided to the entity associated with the venue.

In some examples, the service provider, via the asset transaction component 522, may operate a unit marketplace (e.g., website, application, etc.) that may offer access to the units associated with the NFT(s) that have been purchased by users who does not intend to use the unit that indicated the unit will be available for use. In some cases, once access to the unit has been sold, the service provider may provide proceeds (e.g., payment) to the owner of the NFT and/or the entity associated with the structure. For example, the smart contract associated with the NFT may specify a first portion (e.g., a first amount) of sales proceeds to be provided to the owner of the NFT and a second portion (e.g., a second amount) of sales proceeds to be provided to the entity associated with the structure. In some cases, once the user has purchased the access to the unit, the service provider may generate a machine-readable optical label (e.g., a bar code, QR code, etc.) associated with the unit and may send the machine-readable optical label to the user who purchased the access to the unit.

The data store 524 may store data that is received and processed by the various components of the digital asset component 502. As described above, the data store 524 may store the customer accounts 526. Additionally, the data store 524 may further store a transaction database 528 that tracks transaction associated with NFTs and/or the assets associated with NFTs. In some cases, the transaction data 528 includes a distributed ledger for storing transaction information and other information associated with NFTs. For example, the NFTs may be entered into a distributed ledger such that, when the asset is involved in a transaction (e.g., rented, purchased, etc.), a record of the transaction is securely and permanently entered into the distributed ledger. By utilizing the NFT and the distributed ledger during the transaction of the asset, all participants involved can be assured that proper and secure compensation is being provided for use of the asset.

The machine learning models 530 may be utilized by any of the components discussed herein to perform model training and/or make determinations for digital asset management. For example, the machine learning models 530 may be utilized by the service provider 104 for providing recommendations to users, such as the user 114, the user 120, and/or the entity 112. In some cases, the service provider 104 may determine, via the machine learning models 530, a recommended price for purchasing the NFT associated with a seat, the NFT associated with a unit, a recommended price for transferring an NFT from one user to another, a recommendation to a user for which NFT to purchase, a recommendation to a user for which ticket to purchase, a recommendation to a user for which unit to purchase access to, generation of smart contracts (e.g., a determination and/or recommendation for distributing proceeds between owners of the NFT and entities associated with the venue and/or structure that the NFT is associated with), and the like. The machine learning models 530 may be based on previous interactions (e.g., historical records) that the users, such as the user 114, the user 120, and/or the entity 112, have had with the service provider as well as information associated with the venues and/or structures associated with the NFTs.

Figure 6:
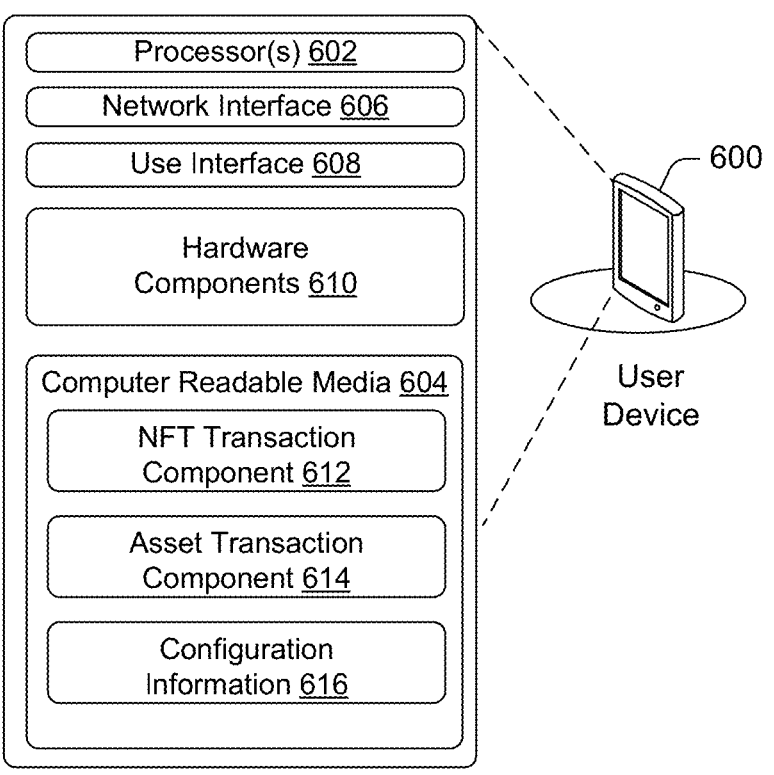
FIG. 6 illustrates a schematic diagram of illustrative components in an example user device that is configured to access a service provider.

FIG. 6 is a schematic diagram of illustrative components in the example user device 600 that is configured to interact with a service provider. The user device 600 may be the same or similar to the user device 122 or the user device 116 and may include processor(s) 602 and computer readable media 604. The computer readable media 604 may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions.

The user device 600 may also include a network interface 606, a user interface 608, and hardware component 610. The network interface 606 may include wireless and/or wired communication components that enable the user device 600 to transmit data to and receive data from other devices via the network. For example, the network interface 606 may include a cellular communication transceiver, a Wi-Fi transceiver, a wired network interface transceiver, and so forth.

The user interface 608 may enable a user to provide inputs and receive outputs from the user device 600. The user interface 608 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The hardware component 610 may include an internal clock, a sound card, a video card, a camera, device interfaces, motion sensors, inertia sensors, proximity sensors, a compass, and/or other components that enable the user device to perform designed functions.

The computer readable media 606 may store an NFT transaction component 612, an asset transaction component 614, and a configuration information 416. The NFT transaction component 612 may be configured to communicate with the NFT transaction component 520 of the service provider 104. For example, the service provider 104 may offer the NFTs 110 for sale on behalf of an entity 112 associated with the venue 108 (e.g., owner, ownership group, etc.) via the NFT transaction component 612 and the smart contract may contain details regarding the rights of ownership of the NFT 110 with respect to a user 114 who may be purchasing the NFT 110 (e.g. a purchaser) and the entity 112 associated with the venue 108.

In some examples, the service provider 104 may offer the NFTs 110, via the NFT transaction component 612, on an individual basis (e.g., individual seats) while in other cases the service provider 104 may offer groups of NFTs 110 for purchase (e.g., groups of seats, rows, sections, etc.). For example, the entity 112 associated with the venue 108 may offer groups of NFTs 110 for sale as an initial investment to a program (e.g., sports team) associated with the venue 108. In this case, a group of NFTs 110 representing a group of seats (e.g., a section) of the venue 108 may be available for purchase in bulk to a purchaser, such as the user 114.

In some examples, the asset transaction component 614 may be configured to communicate with the asset transaction component 522 of the service provider 104. For example, the service provider 104 may operate a ticket marketplace and/or a unit marketplace (e.g., website, application, etc.) that may offer tickets for sale for the seats associated with the NFT(s) 110 and/or the units accessible that are associated with the NFTs 110 that have been purchased by users 114 who does not intend to use the seat 118 during each event and/or do not intend to access the unit and that indicated the seat 118 will be available for any number of single tickets or season ticket purchases and/or indicated that the unit will be available for access. In one example, the service provider 104 may offer the ticket marketplace and/or the unit marketplace via the asset transaction component 614.

The NFT transaction component 612 and/or the asset transaction component 614 may include an operating system. The operating system may further include one or more components that present the output, including display data using the user interface 608, store data in memory, transmit data to another electronic device, and so forth. Additionally, the operating system may include other components that perform various other functions generally associated with an operating system, such as providing an execution environment for applications that are installed on the user device 600. The NFT transaction component 612 and/or the asset transaction component 614 may further include other applications that perform various functions. Such applications may include a browser, applications that control the hardware components 610 of the user device 600, and so forth.

FIGS. 7-9 illustrate processes herein that are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely.

FIG. 7 is a block diagram of an example process 700 for generating a digital asset (e.g., NFT) and establishing a smart contract between users. The processes described in FIG. 7 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For case of description, the processes are described with reference to the environments, architectures and systems described in the examples herein, although the processes may be implemented in a wide variety of other environments, architectures and systems.

At 702, the service provider may determine seat data associated with a seat within a venue to be tokenized. For example, service provider 104 may receive seat data 106 associated with a venue 108. The venue 108 may include any structure containing seats and/or areas categorized by section, row, seat number, etc. The seat data 106 may include the categorizing information as well as other types of information, such as a type of seat (e.g., bleacher, foldable, recliner, box seat, etc.).

At 704, the service provider may determine a value associated with the seat data based at least in part on location data associated with the seat data. For example, the service provider 104 may determine a value associated with each seat based on a location of the seat in the venue 108. For example, a seat closer to the event being performed at the venue 108 may be of a greater value than a seat further from the event.

At 706, the service provider may associate a non-fungible token (NFT) with the seat data. For example, once the seat data 106 is received by the service provider 104 and values are determined for each seat, the service provider 104 may generate (e.g., mint) NFTs to be associated with each seat, such as an NFT 110 (herein referred to as "NFT(s) 110, "NFTs 110, or "NFT 110"). In some examples, the NFTs 110 may be stored on a distributed ledger of the service provider 104.

At 708, the service provider may determine digital rights to associate with the NFT. For example, each NFT 110 may contain a smart contract that governs the rights, obligations, perks, stipulations, opportunities, and/or other information associated with owning the NFT 110.

At 710, the service provider may enter the value of the NFT and the digital rights of the NFT to a distributed ledger network. For example, in cases, where an NFT 110 is involved in a transaction, the details of the transaction may be recorded by the service provider 104 via the distributed ledger. In this way, proof of ownership of the NFT 110 remains on the distributed ledger and the smart contract can never be removed or tampered with.

At 712, the service provider may generate a smart contract between a first entity and a second entity that assigns ownership of at least one of the NFT or the digital rights to the first entity, the second entity being associated with the venue. For example, after purchase of the NFT(s) 110 the user 114 may be subject to the smart contract associated with the purchased NFT(s) 110. The smart contract may govern the rights, obligations, perks, stipulations, opportunities, and/or other information associated with the NFT(s) 110 and the relationship between the user 114 (i.e., the purchaser of the NFT(s) 110) and the entity 112 associated with the venue 108. In some examples, the smart contract may obligate the user 114 to indicate if the user 114 will be utilizing the seat associated with the NFT 110 themselves (e.g., season long usage of the seat during a sports season) or if the user 114 will make the seat available for market use (e.g., allow tickets for the seat to be sold for events in the venue 108). In some cases, the service provider 104 may enable the user 114 to specify particular dates and/or games in which tickets for the seat, such as a seat 118 associated with the NFT 110, may be available to be sold on a ticket marketplace. In some examples, the service provider 104 may enable the user 114 to specify another user (e.g., friend, family member, etc.) who may have access to purchasing tickets for the seat 118.

FIG. 8 is a block diagram of an example process 800 for generating a digital asset (e.g., NFT) and establishing a smart contract between users. The processes described in FIG. 8 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For case of description, the processes are described with reference to the environments, architectures and systems described in the examples herein, although the processes may be implemented in a wide variety of other environments, architectures and systems.

At 802, the service provider may determine a unit of multiple associated units to be tokenized. For example, service provider 204 may receive unit data 206 including categorizing information of the unit (address, floor number, room number, etc.) as well as other types of information, such as a room type (e.g., number of rooms, number of bathrooms, etc.) located with a structure 208.

At 804, the service provider may determine a value associated with the unit based at least in part on a location of the unit within the multiple associated units. For example, service provider 204 may determine a value associated with each unit based on a location of the unit in a structure 208. For example, a unit closer to the top of a structure 208 may be of a greater value than a ground floor unit.

At 806, the service provider may associate a non-fungible token (NFT) with the unit. For example, once the unit data 206 is received by the service provider 204 and values are determined for each unit, the service provider 204 may generate (e.g., mint) NFTs 210 to be associated with each unit.

At 808, the service provider may determine digital rights to associate with the NFT. For example, each NFT 110 may contain a smart contract that governs the rights, obligations, perks, stipulations, opportunities, and/or other information associated with owning the NFT 110.

At 810, the service provider may enter the value of the NFT and the digital rights of the NFT to a distributed ledger network. For example, each NFT 210 may contain a smart contract that governs the rights, obligations, perks, stipulations, opportunities, and/or other information associated with owning the NFT 210.

At 812, the service provider may execute a smart contract that assigns an ownership of at least one of the NFT or the digital rights. For example, the service provider 204 may offer the NFTs 210 for sale on behalf of the entity 212 associated with the structure 208 (e.g., owner, ownership group, etc.) and the smart contract may contain details regarding the rights of ownership of the NFT 210 with respect to a user 214 that may purchase the NFT 210 via the device 216 and the entity 212 associated with the structure 208. In some cases, purchasing the NFT 210 allows the user 214 rights to access the unit associated with the particular NFT 210 assigned to that unit.

FIG. 9 is a block diagram of an example process 900 for generating a digital asset (e.g., NFT) and establishing a smart contract between users. The processes described in FIG. 9 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For ease of description, the processes are described with reference to the environments, architectures and systems described in the examples herein, although the processes may be implemented in a wide variety of other environments, architectures and systems.

At 902, the service provider may determine a unit within multiple associated units to be tokenized. For example, a service provider 104 may receive seat data 106 associated with a venue 108. The venue 108 may include any structure containing seats and/or areas categorized by section, row, seat number, etc. The seat data 106 may include the categorizing information as well as other types of information, such as a type of seat (e.g., bleacher, foldable, recliner, box seat, etc.).

In some examples, a service provider 204 may receive unit data 206 including categorizing information of the unit (address, floor number, room number, etc.) as well as other types of information, such as a room type (e.g., number of rooms, number of bathrooms, etc.) located with a structure 208.

At 904, the service provider may associate a non-fungible token (NFT) with the unit. For example, once the seat data 106 is received by the service provider 104 and values are determined for each seat, the service provider 104 may generate (e.g., mint) NFTs to be associated with each seat, such as an NFT 110 (herein referred to as "NFT(s) 110, "NFTs 110, or "NFT 110"). In some examples, the NFTs 110 may be stored on a distributed ledger of the service provider 104.

In some examples, once the unit data 206 is received by the service provider 204 and values are determined for each unit, the service provider 204 may generate (e.g., mint) NFTs 210 to be associated with each unit.

At 906, the service provider may determine digital rights to associate with the NFT. For example, each NFT 110 may contain a smart contract that governs the rights, obligations, perks, stipulations, opportunities, and/or other information associated with owning the NFT 110.

At 908, the service provider may enter the digital rights of the NFT to a distributed ledger network. For example, in cases, where an NFT 110 is involved in a transaction, the details of the transaction may be recorded by the service provider 104 via the distributed ledger. In this way, proof of ownership of the NFT 110 remains on the distributed ledger and the smart contract can never be removed or tampered with.

At 910, the service provider may execute a smart contract that assigns an ownership of at least one of the NFT or the digital rights to a first user. For example, after purchase of the NFT(s) 110 the user 114 may be subject to the smart contract associated with the purchased NFT(s) 110. The smart contract may govern the rights, obligations, perks, stipulations, opportunities, and/or other information associated with the NFT(s) 110 and the relationship between the user 114 (i.e., the purchaser of the NFT(s) 110) and the entity 112 associated with the venue 108. In some examples, the smart contract may obligate the user 114 to indicate if the user 114 will be utilizing the seat associated with the NFT 110 themselves (e.g., season long usage of the seat during a sports season) or if the user 114 will make the seat available for market use (e.g., allow tickets for the seat to be sold for events in the venue 108). In some cases, the service provider 104 may enable the user 114 to specify particular dates and/or games in which tickets for the seat, such as a seat 118 associated with the NFT 110, may be available to be sold on a ticket marketplace. In some examples, the service provider 104 may enable the user 114 to specify another user (e.g., friend, family member, etc.) who may have access to purchasing tickets for the seat 118.

At 912, the service provider may receive a request to purchase at least one of a ticket associated with the unit or a rent agreement associated with the unit from a second user. For example, the service provider 204 may operate a unit marketplace (e.g., website, application, etc.) that may offer access to the units associated with the NFT(s) 210 that have been purchased by users 214 who does not intend to use the unit and that indicated the unit will be available for use. In some cases, once access to the unit has been sold to another user 220 via a user device 222 accessing the unit marketplace, the service provider 204 may provide proceeds (e.g., payment) to the use 214 (e.g., the owner of the NFT 210) and/or the entity 212 associated with the structure 208. For example, the smart contract associated with the NFT 210 may specify a first portion (e.g., a first amount) of sales proceeds to be provided to the use 214 (e.g., the owner of the NFT 210) and a second portion (e.g., a second amount) of sales proceeds to be provided to the entity 212 associated with the structure 208.

In some examples, the service provider 104 may operate a ticket marketplace (e.g., website, application, etc.) that may offer tickets for sale for the seats associated with the NFT(s) 110 that have been purchased by users 114 who does not intend to use the seat 118 during each event and that indicated the seat 118 will be available for any number of single tickets or season ticket purchases. In one example, the service provider 104 may offer the ticket marketplace to a user 120 via user device 122 operating on a network 124. In some cases, once the ticket for the seat 118 has been sold, the service provider 104 may provide proceeds (e.g., payment) to the owner of the NFT 110 (e.g., the user 114) and/or the entity 112 associated with the venue 108. For example, the smart contract associated with the NFT 110 may specify a first portion (e.g., a first amount) of ticket sales proceeds to be provided to owner of the NFT 110 (e.g., the user 114) and a second portion (e.g., a second amount) of ticket sales proceeds to be provided to the entity 112 associated with the venue 108. In some cases, after the user 120 purchases the ticket, the service provider 104 may automatically query the smart contract associated with the NFT 110 in order to conduct the payment of the ticket sales proceeds to the user 114 and the entity 112 associated with the venue.

At 914, the service provider may execute a transaction associated with the request from the second user. For example, once the user 220 has purchased the access to the unit or a ticket associated with a seat, the service provider

204 may generate a machine-readable optical label (e.g., a bar code, QR code, etc.) associated with the unit and/or the ticket for the seat and may send the machine-readable optical label to the user 220 who purchased the access to the unit and/or seat.

At 916, the service provider may enter a record of the transaction to the distributed ledger network. For example, when a ticket for the seat 118 that is associated with the NFT 110 is involved in a transaction (e.g., sold, bought, traded, etc.) and/or a unit is involved in a transaction, the details of the transaction may be recorded by the service provider 104 via the distributed ledger. In this way, a proof of ownership of the seat 118 and/or or the unit and the NFT 110 may be verified whenever a ticket for the seat 118 and/or the unit is sold, thereby ensuring that proceeds from the transaction are allocated to the appropriate entities (e.g., the owner of the NFT user 114 and/or the entity 112 associated with the venue 108), as opposed to black market vendors.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. Further, SDK(s) and/or API(s) can be used by various platforms/services to enable the various platforms/services (first-party or third-party) to send and/or receive messages via techniques described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 1-6 for convenience and ease of understanding. However, the methods illustrated are not limited to being performed using components described in FIGS. 1-6, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer implemented method comprising:
   determining seat data associated with a seat within a venue to be tokenized;
   determining a monetary value associated with the seat data based at least in part on location data associated with the seat data that indicates a location within the venue;
   associating a non-fungible token (NFT) with the seat data;
   determining digital rights and obligations to associate with the NFT;
   entering the monetary value of the NFT and the digital rights of the NFT to a distributed ledger network;
   generating a smart contract between a first entity and a second entity that assigns ownership of at least one of the NFT or the digital rights to the first entity, the second entity being associated with the venue; and
   utilizing a machine learning module to:
      determine that a number of additional seats are available for purchase;
      determine seat data associated with the additional seats;
      associate additional NFTs to seat data associated each of the additional seats; and
      send an indication to a user that the additional NFTs are available for purchase.

2. The method of claim 1, further comprising:

presenting the digital rights of the NFT for purchase via a user interface; and receiving a request to purchase the digital rights of the NFT, wherein generating the smart contract includes assigning ownership of the digital rights of the NFT to the first entity making the request and assigning the obligations to the first entity making the request.

3. The method of claim 2, wherein:

the digital rights indicate at least one of a season long usage of the seat by the first entity or a market use for the seat; and the obligations include at least requiring the first entity to purchase a season ticket for the seat or indicating that the seat is available for the market use.

4. The method of claim 3, wherein the market use for the seat comprises offering a ticket associated with the seat for sale on a ticket purchasing application.

5. The method of claim 4, the method further comprises:

receiving a request data to purchase the ticket from a third entity via the ticket purchasing application;

receiving payment data for the ticket from the third entity;

providing, based at least in part on querying the smart contract, a first portion of the payment to the first entity and a second portion of the payment to the second entity;

generating a machine-readable optical label associated with the ticket; and sending the machine-readable optical label to the third entity.

6. The method of claim 1, further comprising receiving request data to trade the digital rights of the NFT from the first entity to a third entity.

7. The method of claim 1, wherein the venue comprises at least one of a sports venue, a concert venue, or a movie theater.

8. The method of claim 1, wherein the seat data comprises at least one of a location of the venue, a section of the seat, a row of the seat, or a seat number.

9. A method, implemented at least in part by a server computing device of a service provider, the method comprising:

determining a unit within multiple associated units to be tokenized;

determining a monetary value associated with the unit based at least in part on a location of the unit within the multiple associated units;

associating a non-fungible token (NFT) with the unit;

determining digital rights to associate with the NFT;

entering the monetary value and the digital rights of the NFT to a distributed ledger network;

executing a smart contract that assigns an ownership of at least one of the NFT or the digital rights to a first user;

receiving a request to purchase at least one of a ticket associated with the unit or a rent agreement associated with the unit from a second user;

executing a transaction associated with the request from the second user;

entering a record of the transaction to the distributed ledger network;

receiving payment for the unit from the second user; and providing a first portion of the payment to the first user and a second portion of the payment to a third user associated with the multiple associated units.

10. The method of claim 9, further comprising sending at least one of a machine-readable optical label associated with the ticket to a device associated with the second user or sending confirmation of the rent agreement to the device associated with the second user.

11. The method of claim 9, wherein the monetary value is determined based at least in part on how close the location of the unit is to a ground level.

12. A computer implemented method comprising:

determining seat data associated with a seat within a venue to be tokenized;

determining a monetary value associated with the seat data based at least in part on location data associated with the seat data that indicates a location within the venue;

associating a non-fungible token (NFT) with the seat data;

determining digital rights and obligations to associate with the NFT;

entering the monetary value of the NFT and the digital rights of the NFT to a distributed ledger network;

generating a smart contract between a first entity and a second entity that assigns ownership of at least one of the NFT or the digital rights to the first entity, the second entity being associated with the venue;

receiving a request data to purchase a ticket from a third entity via a ticket purchasing application;

receiving payment data for the ticket from the third entity;

providing, based at least in part on querying the smart contract, a first portion of the payment to the first entity and a second portion of the payment to the second entity;

generating a machine-readable optical label associated with the ticket; and sending the machine-readable optical label to the third entity.

13. The method of claim 12, further comprising:

presenting the digital rights of the NFT for purchase via a user interface; and receiving a request to purchase the digital rights of the NFT, wherein generating the smart contract includes assigning ownership of the digital rights of the NFT to the first entity making the request and assigning the obligations to the first entity making the request.

14. The method of claim 13, wherein:

the digital rights indicate at least one of a season long usage of the seat by the first entity or a market use for the seat; and the obligations include at least requiring the first entity to purchase a season ticket for the seat or indicating that the seat is available for the market use.

15. The method of claim 14, wherein the market use for the seat comprises offering the ticket associated with the seat for sale on the ticket purchasing application.

16. The method of claim 12, further comprising receiving request data to trade the digital rights of the NFT from the first entity to a third entity.

17. The method of claim 12, wherein the venue comprises at least one of a sports venue, a concert venue, or a movie theater.

18. The method of claim 12, wherein the seat data comprises at least one of a location of the venue, a section of the seat, a row of the seat, or a seat number.

* * * * *